(12) United States Patent
Shoji et al.

(10) Patent No.: US 7,959,881 B2
(45) Date of Patent: Jun. 14, 2011

(54) METHOD FOR SCRUBBING AN AMINE TYPE EXTRACTANT AFTER STRIPPING

(75) Inventors: Hirofumi Shoji, Niihama (JP); Hiroshi Kobayashi, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 12/458,599

(22) Filed: Jul. 16, 2009

(65) Prior Publication Data
US 2010/0032382 A1 Feb. 11, 2010

(30) Foreign Application Priority Data
Aug. 7, 2008 (JP) .................................. 2008-204105

(51) Int. Cl.
*B01D 11/00* (2006.01)
(52) U.S. Cl. ....................................... 423/139; 564/497
(58) Field of Classification Search .................. 423/139; 564/497; 252/182.3, 182.34; 210/758, 759; 75/722; 556/28, 118, 138
See application file for complete search history.

(56) References Cited

U.S. PATENT DOCUMENTS

| | | | | | |
|---|---|---|---|---|---|
| 3,903,235 | A | * | 9/1975 | Cardwell et al. | 423/24 |
| 6,312,500 | B1 | * | 11/2001 | Duyvesteyn et al. | 75/712 |
| 6,951,960 | B2 | * | 10/2005 | Perraud | 564/497 |

FOREIGN PATENT DOCUMENTS

| | | | |
|---|---|---|---|
| JP | 3-40089 | | 9/1987 |
| JP | 62-218525 | * | 9/1987 |
| JP | 2004-107791 | * | 4/2004 |
| JP | 3844752 | | 4/2004 |
| WO | 2008-080209 | * | 10/2008 |

* cited by examiner

*Primary Examiner* — Steven Bos
(74) *Attorney, Agent, or Firm* — Edwards Angell Palmer & Dodge LLP

(57) ABSTRACT

The method for scrubbing an amine type extractant after stripping to be able to regenerate the same so that the amine type extractant can be repeatedly reused as it is in the extraction stage in the solvent extraction process, when an amine type extractant is regenerated by scrubbing an amine type extractant (A) containing an iron and a zinc chloro complex ion obtained by back extracting a cobalt with a hydrochloric acid aqueous solution from the amine type extractant after extracting a cobalt.

The method is characterized by comprising the procedures of the following (1) to (3).

(1) an amine type extractant (B) is obtained by adding an aqueous solution containing a sulfite ion to an amine type extractant (A) and stirring the mixture and reducing a ferric (III) chloro complex ion to divalent.

(2) an amine type extractant (C) is obtained by adding an aqueous solution containing an oxidizing agent to the amine type extractant (B) and stirring the mixture and oxidizing a sulfite ion to sulfate ion.

(3) an amine type extractant removed an iron and a zinc is obtained by adding an aqueous solution containing a chloride ion to the amine type extractant (C) and stirring the mixture and replacing a sulfate ion with chloride ion.

12 Claims, No Drawings

METHOD FOR SCRUBBING AN AMINE TYPE EXTRACTANT AFTER STRIPPING

BACKGROUND OF THE INVENTION

1. Field of the Invention

The present invention relates to a method for scrubbing an amine type extractant after stripping, in more detail, the present invention relates to a method for scrubbing an amine type extractant after stripping which can remove an iron and a zinc efficiently and also regenerate extracting capability of the amine type extractant so that the amine type extractant can be repeatedly reused as it is in the extraction stage in the solvent extraction process, when an amine type extractant is regenerated by scrubbing an amine type extractant containing a ferric (III) chloro complex ion and a zinc chloro complex ion obtained by back extracting a cobalt with a hydrochloric acid aqueous solution from the amine type extractant after extracting cobalt, in the solvent extraction in which cobalt is extracted from a hydrochloric acid aqueous solution containing a nickel and a cobalt and separate from nickel.

2. Description of the Prior Art

Since some amount of cobalt often exists together in raw mineral ores for nickel smelting, cobalt as well as nickel is commonly recovered in the nickel smelting. As a separation method of nickel and cobalt, a method had been used in which cobalt precipitate is separated by using an oxidation neutralization method in which an aqueous solution containing a nickel and a cobalt is neutralized while oxidizing by utilizing a slight difference in susceptibility to oxidation between nickel and cobalt. However, since the above-described oxidation neutralization method was accompanied by coprecipitation of a considerable amount of nickel in the cobalt precipitates formed if cobalt is intended to be sufficiently separated, there was a problem in production efficiency that a reprocessing step for once separated cobalt precipitates is additionally required. In particular, when cobalt content in nickel aqueous solution was high, the oxidation neutralization method could not be a desirable method.

Consequently, in recent years, a solvent extraction has been widely used in which nickel and cobalt are separated by utilizing an extractant consisting of organic solvent. The solvent extraction makes it possible to separate nickel and cobalt contained in the mother liquid for extraction by comparatively simple facilities, and has great effects on cost saving and improved quality. Here, the extractant to be used for separation of nickel and cobalt includes, for example, a phosphate ester type acidic extractant represented by CYANEX 272 (product name), active component being bis(2,4,4-trimethylpentyl)phosphinic acid, produced by Cytec Ind. Inc., or an amine type extractant represented by TNOA.

It should be noted that, when raw material aqueous solution (mother liquid for extraction) for solvent extraction is an aqueous solution of chlorides, an amine type extractant is more commonly used than phosphate ester type one considering separation performance between cobalt and nickel, possibility of crud formation, cost, and the like. In this case, the solvent extraction process comprises an extraction stage in which chloro complex ion of a target metal contained in the raw material aqueous solution is supported by an amine type extractant constituting an organic phase, a stripping stage following thereto in which the target metal supported by the organic phase is eliminated by an aqueous solution forming an aqueous phase, and then a scrubbing stage to separate and remove the components remaining in the organic phase from the organic phase by elimination or substitution reaction with the aqueous solution forming the aqueous phase.

Incidentally, in the solvent extraction operation, an amine type extractant has the following characteristics.

Since the amine type extractant tends generally to have a sufficient extracting character by adding a hydrochloric acid, according to the following chemical equation 1, and extraction of chloro complex ion is performed according to the following chemical equation 2, the amine type extractant exhibits a superior separation characteristic of cobalt and nickel.

By this reaction, the amine ($R_3N$:) generates an amine added with hydrochloric acid by hydrochloric acid.

(wherein, M represents a metal species to form a chloro complex ion of Zn, Fe, Cu, Co, or the like.)

According to this reaction, metal species to form a chloro complex ion of Zn, Fe, Cu, Co, or the like is extracted to form an amine supporting a metal chloro complex ion. It should be noted that, since nickel does not form a chloro complex ion, it remains in the residual liquid for extraction and is thus separated. Accordingly, when nickel aqueous solution contains metals which have higher chloro-complex-forming abilities than cobalt, that is, which are supported more strongly than cobalt, such as iron, zinc, these metals are preferentially extracted and accumulated in the extractant, resulting in such a problem that amount of cobalt to be extracted is reduced.

For this reason, as a regeneration treatment to recover extracting capability, removal of the accumulated impurities, for example, by washing the extractant after stripping with water had been carried out. In the above-described water washing, the extractant is diluted by adding a water and mixing until chloride concentration reaches a level where the impurity element in the extractant cannot form a chloro complex ion, to eliminate the impurity element from the extractant and regenerate extracting capability of the extractant.

However, in order to dilute up to a level where chloro complex ion thereof cannot be formed, for example, in the case of iron, its concentration as chloride in the extractant has to be reduced to around 1 g/L, and a large amount of water is required. Consequently, this method is not industrially advantageous considering water balance and load in waste water treatment process.

Therefore, as an alternative method, a method has been proposed, in which in the scrubbing stage, the extractant is neutralized by contacting with a strong alkaline aqueous solution to remove chloro complex ion accumulated in the extractant. It should be noted that, in such a method using alkali neutralization, the metal chloro complex ion is generally removed as a hydroxide by contacting the extractant with an aqueous solution of sodium hydroxide and the like according to the following chemical equation 3.

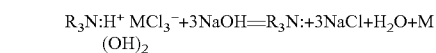

(wherein, M represents a metal species to form a chloro complex ion of Zn, Fe, or the like.)

In this case, iron is removed from the extractant as hydroxide precipitates, and zinc is similarly removed as hydroxide precipitates or hydroxo complex ion. However, the hydroxide often forms precipitates called as crud which tends to cause blockage of equipment piping making the reuse of the extractant difficult. For this reason, a step in which the extractant and the crud were filtered and separated from each other was required to be installed after washing, but the step required cost for the facility and labor because the crud was difficult to filter. In addition, since sodium hydroxide is expensive as an operational material, it was undesirable to use sodium hydroxide for removals of iron and zinc which have only small merit for recoveries thereof. Furthermore, since the amine type extractant itself returns to free amine by the alkali neutralization mentioned above, there was a problem that addition of hydrochloric acid or sulfuric acid had to be done thereafter in order to fully regenerate extracting capability thereof.

As a solution for this problem, for example, a method for regenerating an extractant has been proposed. In this method, in a solvent extraction step for a metal using a water-insoluble tertiary amine extractant solution as an extractant, said extractant accumulated with component having a strong bonding force to the tertiary amine is contacted with a potassium oxalate aqueous solution in the presence of potassium chloride, to regenerate said extracting solvent by back extracting the component having a strong bonding force to the tertiary amine in said extraction solvent, to regenerate by separating and precipitating as hydroxide said component having a strong bonding force to the tertiary amine with adding potassium hydroxide to said liquid after stripping, and said regenerated back extracted liquid is circulated to the regeneration step for extracting solvent (see, for example, Patent Literature 1). By using this method, extracting capability of the extractant can be regenerated by separating the impurity elements such as iron accumulated in the amine type extractant.

However, since potassium oxalate to be used in this method is costly as well as a deleterious substance, there is concerns such as increased load in waste water treatment step, increased risk factors in environment and safety, in its use in practical operation. In addition, there was such a problem that, when an impurity was precipitated in a form of hydroxide by adding potassium hydroxide, operation could become difficult because load of filtration facility was increased by minute precipitates formed or a part of precipitates remained in the extractant as crud.

Further, as another alternative method, a method for regenerating a metal supporting ability of amine had been proposed. This method comprises contacting a liquid organic phase containing a metal supported by amine as a chloride complex and a complexing amine with an aqueous solution containing sulfate ion, nitrate ion and/or phosphate ion but no chloride ion to strip out the metal, and contacting the stripped organic phase with a solution containing a chloride ion to add chlorine to the amine (see, for example, Patent Literature 2). Such regeneration method, in which an amine type extractant is washed by contacting with an acid having a high ion strength such as sulfuric acid other than chlorides, then contacting with hydrochloric acid solution to add chlorine to the extractant, has a feature that the method can regenerate extracting capability by separating the impurity elements without forming the precipitates in the extractant.

However, in order to remove impurity element of chloride complex present in the extractant, it is believed that concentration of chloride in the extractant is required to be reduced to such a low concentration as 1 g/L or less. Dilution of the extractant by mixing a large volume of solution containing an acid to reduce concentration of chloride increases cost of acid to be used. In addition, since a large amount of waste water is generated, processing of the waste water via neutralization, separation of precipitates, and waste water treatment was not easy because a large scale of facility, much labor, and the like were needed. In addition, since sulfate ion remains during extractant, there is a risk that mother liquid for extraction is contaminated with sulfate ion when this extractant is used for extraction again. If sulfate ion is mixed in a chloride type extraction liquid, electrode is deteriorated in the subsequent electrowinning step and raise voltage of electrolytic bath, resulting in cost increase. Furthermore, the extractant after removing the impurity elements by the above method has to be subject to the treatment to add chlorine by contacting with a solution containing chloride such as hydrochloric acid. This process required much cost and labor.

Under such circumstance, a more efficient scrubbing method is demanded, by which it is achieved that formation of precipitates and crud is not accompanied when extracting capability of an amine type extractant supporting a chloro complex ion of metal such as iron, zinc is regenerated, and that no treatment to add chlorine to the extractant after removing the impurity elements is required and operational material cost is low, and the like.

[Patent Literature 1]: JP-B-3-40089 (page 1)
[Patent Literature 2]: JP No. 3844752 (pages 1 and 2)

SUMMARY OF THE INVENTION

In view of problems of the above-described conventional technologies, an object of the present invention is to provide a method for scrubbing an amine type extractant after stripping to remove iron and zinc efficiently as well as to be able to regenerate the extracting capability of the amine type extractant so that the amine type extractant can be repeatedly reused as it is in the extraction stage in the solvent extraction process, when an amine type extractant is regenerated by scrubbing an amine type extractant containing a ferric (III) chloro complex ion and zinc chloro complex ion obtained by back extracting cobalt with a hydrochloric acid aqueous solution from the amine type extractant after extracting a cobalt, in the solvent extraction in which cobalt is extracted from a hydrochloric acid aqueous solution containing a nickel and a cobalt and separate from nickel.

In order to achieve the above-described object, the present inventors have intensively studied a method for regenerating the extracting capability of an amine type extractant (A) containing a ferric (III) chloro complex ion and zinc chloro complex ion obtained by back extracting cobalt with a hydrochloric acid aqueous solution from amine type extractant after extracting cobalt. As a result, after carrying out scrubbing of said amine type extractant (A) with an aqueous solution containing sulfite ion (procedure of (1)), scrubbing the same with an aqueous solution containing an oxidizing agent (procedure of (2)), and scrubbing the same with an aqueous solution containing a chloride ion (procedure of (3)) sequentially under specific conditions, the present inventors have found that chloro complex ions of metals such as iron, zinc can be efficiently removed, as well as that extracting capability of the extractant can be regenerated so that the extractant can be reused as it is in the extraction stage, and accomplished the present invention. Furthermore, it is more advantageous due to simplified scrubbing procedure that, following the scrubbing with an aqueous solution containing a sulfite ion (procedure of (1)), a procedure of adding an oxidizing agent then scrubbing with an aqueous solution containing a chloride ion (procedure of (4)) instead of procedures (2) and (3) is carried out under specified conditions.

Namely, according to the first aspect of the present invention, there is provided a method for scrubbing an amine type extractant after stripping, said method being a scrubbing method of an amine type extractant (A) containing a ferric (III) chloro complex ion and a zinc chloro complex ion obtained by back extracting a cobalt with a hydrochloric acid aqueous solution from an amine type extractant after extracting a cobalt, in the solvent extraction for extracting a cobalt from a hydrochloric acid aqueous solution containing a nickel and a cobalt and separating a cobalt from a nickel, characterized by comprising the procedures of the following (1) to (3).

(1) An amine type extractant (B) containing a sulfite ion is obtained by adding an aqueous solution containing a sulfite ion to the above amine type extractant (A) and stirring the mixture so that oxidation-reduction potential (based on silver/silver chloride electrode) of the aqueous solution after scrubbing becomes 80 to 550 mV, reducing a ferric (III) chloro complex ion in said amine type extractant (A) to divalent, then after leaving at rest, separating the aqueous solution containing a ferrous (II) chloro complex ion and zinc sulfite formed.

(2) An amine type extractant (C) containing a sulfate ion is obtained by adding an aqueous solution containing an oxidizing agent or an oxidizing agent and water to the above amine type extractant (B) and stirring the mixture so that oxidation-reduction potential (based on silver/silver chloride electrode) of the aqueous solution after scrubbing becomes 80 to 550 mV, oxidizing a sulfite ion in said amine type extractant (B) to sulfate ion, then after leaving at rest, separating the sulfate aqueous solution formed.

(3) An amine type extractant (D) removed an iron and a zinc is obtained by adding an aqueous solution containing a chloride ion to the above amine type extractant (C) and stirring the mixture, replacing a sulfate ion in said amine type extractant (C) with chloride ion, then after leaving at rest, separating the aqueous solution containing a sulfate ion formed.

Further, according to the second aspect of the present invention, there is provided the method for scrubbing an amine type extractant after stripping, characterized by comprising the procedure of the following (4) instead of the procedures of the above (2) and (3) in the first aspect:

(4) An amine type extractant (D) removed an iron and a zinc is obtained by adding an oxidizing agent and also an aqueous solution containing chloride ion to the above amine type extractant (B) and stirring the mixture so that oxidation-reduction potential (based on silver/silver chloride electrode) of the aqueous solution after scrubbing becomes 80 to 550 mV, oxidizing a sulfite ion in said amine type extractant (B) to a sulfate ion, and also replacing said sulfate ion with chloride ion, then after leaving at rest, separating the aqueous solution containing the sulfate ion formed.

In addition, according to the third aspect of the present invention, there is provided the method for scrubbing an amine type extractant after stripping, characterized in that, in the procedure of the above (1), the aqueous solution containing a sulfite ion is a sulfurous acid solution in the first or the second aspect.

In addition, according to the fourth aspect of the present invention, there is provided the method for scrubbing an amine type extractant after stripping, characterized in that, in the procedure of the above (2), the oxidizing agent is hydrogen peroxide in the first aspect.

In addition, according to the fifth aspect of the present invention, there is provided the method for scrubbing an amine type extractant after stripping, characterized in that, in the procedure of the above (4), the oxidizing agent is hydrogen peroxide and the aqueous solution containing a chloride ion is an aqueous solution containing a hydrochloric acid or sodium chloride in the second aspect.

In addition, according to the sixth aspect of the present invention, there is provided the method for scrubbing an amine type extractant after stripping, characterized in that the above amine type extractant contains at least one kind of tertiary amine selected from TNOA or TIOA and a diluent consisting of an aromatic hydrocarbon, and said tertiary amine is contained in 10 to 40% by volume to the total volume in any one of the first to the fifth aspects.

Since the method for scrubbing an amine type extractant after stripping of the present invention can remove iron and zinc efficiently and also regenerate extracting capability of the amine type extractant so that the amine type extractant can be repeatedly reused as it is in the extraction stage in the solvent extraction process, when the amine type extractant is regenerated by scrubbing the amine type extractant containing a ferric (III) chloro complex ion and zinc chloro complex ion obtained by back extracting cobalt with a hydrochloric acid aqueous solution from the amine type extractant after extracting a cobalt, in the solvent extraction in which cobalt is extracted from a hydrochloric acid aqueous solution containing a nickel and cobalt and separate from nickel, the method is industrially extremely worthwhile. Moreover, in this case, in the method of the present invention, general extraction facilities such as mixer settler, pulse column can be used as they are without requiring special facility, and further, such requirements as precipitate or crud is not formed, cost for operational materials is low, volume of the liquid to be scrubbed is less because chloride concentration in the extractant need not to be reduced by diluting with water, and the like, can be satisfied. Consequently, the method of the present invention is more advantageous than the conventional methods.

DETAILED DESCRIPTION OF THE INVENTION

The method for scrubbing an amine type extractant after stripping of the present invention is a scrubbing method of an amine type extractant (A) containing a ferric (III) chloride complex ion and zinc chloride complex ion obtained by back extracting a cobalt with a hydrochloric acid aqueous solution from the amine type extractant after extracting a cobalt, in the solvent extraction for extracting a cobalt from a hydrochloric acid aqueous solution containing a nickel and cobalt and separating cobalt from nickel, characterized by comprising the procedures of the following (1) to (3).

(1) An amine type extractant (B) containing a sulfite ion is obtained by adding an aqueous solution containing a sulfite ion to the above amine type extractant (A) and stirring the mixture so that oxidation-reduction potential (based on silver/silver chloride electrode) of the aqueous solution after scrubbing becomes 80 to 550 mV, reducing a ferric (III) chloro complex ion in said amine type extractant (A) to divalent, then after leaving at rest, separating the aqueous solution containing a ferrous (II) chloro complex ion and zinc sulfite formed.

(2) An amine type extractant (C) containing a sulfate ion is obtained by adding an aqueous solution containing an oxidizing agent or an oxidizing agent and water to the above amine type extractant (B) and stirring the mixture so that oxidation-reduction potential (based on silver/silver chloride electrode) of the aqueous solution after scrubbing becomes 80 to 550 mV, oxidizing a sulfite ion in said amine type extractant (B) to sulfate ion, then after leaving at rest, separating the sulfate aqueous solution formed.

(3) An amine type extractant (D) removed an iron and a zinc is obtained by adding an aqueous solution containing a chloride ion to the above amine type extractant (C) and stirring the mixture, replacing a sulfate ion in said amine type extractant (C) with chloride ion, then after leaving at rest, separating the aqueous solution containing a sulfate ion formed.

Further, the method for scrubbing an amine type extractant after stripping of the present invention can comprise the procedure of the following (4) instead of the procedures of the above (2) and (3).

(4) An amine type extractant (D) removed an iron and a zinc is obtained by adding an oxidizing agent and also an aqueous solution containing chloride ion to the above amine type extractant (B) and stirring the mixture so that oxidation-reduction potential (based on silver/silver chloride electrode) of the aqueous solution after scrubbing becomes 80 to 550 mV, oxidizing a sulfite ion in said amine type extractant (B) to a sulfate ion, and also replacing said sulfate ion with chloride ion, then after leaving at rest, separating the aqueous solution containing the sulfate ion formed.

In the present invention, it is important firstly to remove iron and zinc with using an aqueous solution containing a sulfite ion as a scrubbing liquid which achieves equilibrium with the above amine type extractant (A) by contacting therewith. After that, a procedure follows in which sulfite ion remaining in the resultant amine type extractant (B) is oxidized and replaced by the chloride ion.

Namely, metals such as iron, zinc can be generally removed by using a scrubbing liquid not containing a chloride ion and contacting in multistage this liquid with the amine type extractant accumulated by said metals to reduce concentration of chloride ion to a level at which chloro complex ion is vanished. However, in removal of such metals having a high chloro-complex-ion-forming ability as iron and zinc, simple repeating only of such scrubbing requires a large amount of scrubbing liquid for dilution to reduce sufficiently concentration of chloride ion in the aqueous phase in equilibrium.

On the contrary, in the present invention, firstly, by using a sulfite ion, chloro complex ion composed of trivalent ferric ion (ferric (III) chloro complex ion) in the extractant is reduced to chloro complex ion composed of divalent ferrous ion (ferrous (II) chloro complex ion), that is, converted to a form which cannot be extracted by the amine type extractant, to be eliminated from the extractant. At the same time, by using a sulfite ion, zinc chloro complex ion in the extractant is converted to zinc sulfite to be eliminated from the extractant. After that, sulfite ion, which is extracted by the extractant and contained therein, is oxidized to sulfate ion, and finally sulfate ion remaining in the extractant is removed by a chloride aqueous solution.

Namely, since iron and zinc accumulated in the amine type extractant can be eliminated without being influenced by concentration of chloride in said extractant, reduction of the concentration of chloride to a level of 1 g/L or lower by dilution etc. is not necessary. Accordingly, such requirements as precipitate or crud is not formed, cost for operational materials is low, volume of the liquid to be scrubbed is less because reduction of chloride concentration in the extractant by diluting with water is not necessary, and the like, can be satisfied.

The solvent extraction to be used in the present invention is the one in which cobalt is extracted from a hydrochloric acid aqueous solution containing a nickel and cobalt and separated from nickel.

The solvent extraction process to be used in the above solvent extraction is not particularly limited, and the method comprises an extraction stage in which metal chloro complex ion contained in an acidic chloride aqueous solution is supported on said extractant by the amine type extractant forming an organic phase, a stripping stage following thereto in which cobalt supported on the extractant of said organic phase is eliminated by an aqueous solution forming an aqueous phase, and then a scrubbing stage in which components remained in said organic phase is separated and removed by elimination reaction or substitution reaction by the aqueous solution forming the aqueous phase. It should be noted that, in the above extraction stage, an organic phase consisting of an amine type extractant and an aqueous phase consisting of an acidic chloride aqueous solution are mixed and contacted with each other, and cobalt chloro complex ion contained in said aqueous solution is supported on the extractant to leave nickel remained in the residual extracted liquid. In this case, if chloro complex ions such as iron, zinc, copper exist together, these ions are supported on the extractant. In addition, in the stripping stage following thereto, the organic phase from the extraction stage and the aqueous phase consisting of dilute hydrochloric acid aqueous solution are mixed and contacted with each other, and cobalt supported on the organic phase is migrated to the aqueous phase to be separated.

The amine type extractant (A) to be used in the method of the present invention includes ferric (III) chloro complex ion and zinc chloro complex ion obtained by stripping cobalt with a hydrochloric acid aqueous solution from the amine type extractant after extracting a cobalt, in the solvent extraction to extract cobalt from a hydrochloric acid aqueous solution containing a nickel and cobalt and separate from nickel.

Composition of the above-described amine type extractant is not particularly limited, but tertiary amines having superior selectivity for nickel and cobalt are used. Among them, at least one tertiary amine selected from TNOA and TIOA is preferable, and TNOA is more preferable. It should be noted that, the above tertiary amine may be used in a concentration of 10 to 40% by volume to the total amount of the amine type extractant by mixing with a diluents consisting of an aromatic hydrocarbon if necessary because of viscosity and extraction efficiency of the organic phase.

Hereinafter, the method of the present invention will be described along with the order of each procedure.

1. Procedure of (1)

The procedure of the above-described (1) is the one to obtain amine type extractant (B) containing a sulfite ion by adding an aqueous solution containing a sulfite ion to the above amine type extractant (A) and stirring the mixture so that oxidation-reduction potential (based on silver/silver chloride electrode) of the aqueous solution after scrubbing becomes 80 to 550 mV, to reduce ferric (III) chloro complex ion in said amine type extractant (A) to divalent one, then after leaving at rest, separating the aqueous solution containing a ferrous (II) chloro complex ion and zinc sulfite formed. Here, it is utilized as for iron that ferrous (II) chloro complex ion has a property not to be extracted by the amine type extractant differing from ferric (III) chloro complex ion, and as for zinc that zinc tends to form sulfite salt rather than chloro complex ion and most of zinc sulfite formed can be eliminated from the extractant although a part of the salt is extracted by the amine type extractant.

The aqueous solution containing a sulfite ion to be used in the procedure of the above-described (1) is not particularly limited, and sulfurous acid solution, sodium sulfite aqueous solution, potassium sulfite aqueous solution, hydrazine, etc. are used. Among them, it is preferable to use sulfurous acid solution obtained by saturating a sulfurous gas, which is cheap and easy to handle, into water and also giving less load to facility material, waste water treatment, etc.

The oxidation-reduction potential to be used in the procedure of the above-described (1) is controlled by adjusting the addition amount of sulfite ion so that the oxidation-reduction potential (based on silver/silver chloride electrode) of the aqueous solution after scrubbing becomes 80 to 550 mV, and preferably 150 to 250 mV. Namely, the oxidation-reduction potential is controlled so as to be maintained in the specified range by measuring the oxidation-reduction potential, although addition amount of sulfite ion cannot be unconditionally determined because it varies depending on reaction efficiency. Here, when the oxidation-reduction potential (based on silver/silver chloride electrode) exceeds 550 mV, reduction of ferric (III) chloro complex ion becomes insufficient. On the contrary, the lower limit of the oxidation-reduction potential (based on silver/silver chloride electrode) is preferably 80 mV where there is no risk for iron or zinc to deposit as a metal state and also sulfite ion and sulfate ion are held in equilibrium.

2. Procedure of (2)

The procedure of the above-described (2) is the one to obtain amine type extractant (C) containing a sulfate ion by adding an aqueous solution containing an oxidizing agent or an oxidizing agent and water to said amine type extractant (B) and stirring the mixture so that oxidation-reduction potential (based on silver/silver chloride electrode) of the aqueous solution after scrubbing becomes 80 to 550 mV, to oxidize sulfite ion in said amine type extractant (B) to sulfate ion, then after leaving at rest, separating the sulfate aqueous solution formed.

Namely, selectivity of the amine type extractant tends to be stronger to sulfite ion than to chloride ion in a range of a specified chloride ion concentration or higher. For this reason, since a part of sulfite ion is accumulated and remains in the above-described amine type extractant (B), regeneration of extracting capability of the amine type extractant for cobalt is insufficient by the procedure alone of (1) yet. Therefore, in the present procedure, sulfite ion in the amine type extractant (B) is oxidized to sulfate ion, which is hardly extracted by the amine type extractant, to be eliminated. It should be noted that, zinc and iron partly remaining in the above-described amine type extractant (B) are eliminated at the same time.

The oxidizing agent to be used in procedure of the above-described (2) is not particularly limited, and the oxidation is performed by adding an aqueous solution containing a hydrogen peroxide or hypochlorous acid, or bubbling a gas such as oxygen, air, chlorine, ozone in the presence of water.

The oxidation-reduction potential to be used in the procedure of the above-described (2) is controlled by adjusting the addition amount of the oxidizing agent so that the oxidation-reduction potential (based on silver/silver chloride electrode) of the aqueous solution after scrubbing becomes 80 to 550 mV, preferably 150 to 250 mV. Namely, when the amine type extractant (B) is excessively oxidized, ions of impurity elements such as iron and zinc remaining in the amine type extractant (B) form chloro complex ions again, and the impurity elements could be extracted again or the amine type extractant itself could be oxidized and deteriorated. Here, when the oxidation-reduction potential (based on silver/silver chloride electrode) exceeds 550 mV, the amine type extractant itself is oxidized. On the contrary, when the oxidation-reduction potential (based on silver/silver chloride electrode) is lower than 80 mV, oxidation of sulfite ion to sulfate ion is insufficient.

3. Procedure of (3)

The procedure of the above-described (3) is the one which the amine type extractant (D) removed iron and zinc is obtained by adding an aqueous solution containing a chloride ion to the above-described amine type extractant (C) and stirring the mixture to replace sulfate ion in said amine type extractant (C) with chloride ion, then after leaving at rest, separating the aqueous solution containing sulfate ion formed.

Namely, in the procedure of the above-described (2), sulfate ion formed by oxidation is mostly separated from the amine type extractant, but partly entrained and remains in the amine type extractant. For this reason, in order to regenerate extracting capability of the amine type extractant so that the amine type extractant can be repeatedly reused as it is in the extraction stage in the solvent extraction process, removal of such sulfate ion is desirable. In the present procedure, sulfate ion is removed simultaneously by scrubbing the amine type extractant (C) using a chloride aqueous solution, while chloride ion carried away from the amine type extractant (A) through accompanying to impurity elements and the like is replenished. By this procedure, the process of chlorine addition to the amine which is required when the extractant is washed with alkali or water becomes unnecessary. In addition, since sulfate ion contained in the amine type extractant (C) is separated, mixing thereof into mother liquid for extraction in the extraction stage in the solvent extraction process is prevented, and thereby deterioration of electrode and voltage rise of electrolytic bath in electrowinning process caused by mixing in of sulfate ion can be inhibited.

The aqueous solution containing a chloride ion to be used in the procedure of the above-described (3) is not particularly limited, and hydrochloric acid, sodium chloride aqueous solution or potassium chloride aqueous solution is used, but sodium chloride aqueous solution is preferably used because pH adjustment is not required, volume of effluent can be reduced, and relevant chemicals can be saved.

Concentration of the chloride ion in the aqueous solution containing a chloride ion to be used in the procedure of the above-described (3) is not particularly limited, and may be within a range from 100 g/L to the concentration of chloride ion in the mother liquid for extraction in the solvent extraction process. Namely, since selectivity of the amine type extractant to chloride ion is, within a certain range of chloride ion concentration, weaker than that to sulfite ion and stronger than that to sulfate ion, the above-described selectivity can be maintained by setting the ion concentration to the above range.

4. Procedure of (4)

The procedure of the above-described (4) is the one which amine type extractant (D) removed iron and zinc is obtained by adding an oxidizing agent to the above-described amine type extractant (B) so that oxidation-reduction potential (based on silver/silver chloride electrode) of the aqueous solution after scrubbing becomes 80 to 550 mV, and also an aqueous solution containing a chloride ion and stirring the mixture to oxidize sulfite ion in said amine type extractant (B) to sulfate ion, then after leaving at rest, separating the aqueous solution containing sulfate ion formed.

The control of oxidation-reduction potential to be used in the procedure of the above-described (4) is performed under specified conditions in the same way as in the procedure of the above-described (2). Here, addition of the oxidizing agent is carried out by adding an aqueous solution containing a hydrogen peroxide or hypochlorous acid simultaneously together with an aqueous solution containing a chloride ion, or after mixing an aqueous solution containing a chloride ion, bubbling a gas such as oxygen, air, chlorine, ozone.

As the method for scrubbing to be used in the procedures of the above-described (1) to (4), a batch type, or a continuous type such as countercurrent type, concurrent flow type, is used, and in each procedure, a multistage solvent extraction facility such as mixer settler type generally industrialized, in which an organic phase and an aqueous phase are mixed and contacted, for example, by stirring so that both phases can sufficiently contacted with each other, then left at rest and separated from each other, is used. In addition, temperature of the liquid is not particularly limited, and 20 to 40° C. is preferable. In addition, volume ratio (ratio of organic phase/water phase) of the organic phase to the aqueous phase is not particularly limited, and is preferably 5 to 1/5, and more preferably 3 to 1.

EXAMPLES

Hereinafter, the present invention will be described in more detail by Examples of the present invention and Comparative Examples, however, the present invention is never limited by these Examples. It should be noted that, analysis of metal used in Examples and Comparative Examples was performed by ICP emission spectrometry. It should be noted that, organic phases were chemically decomposed, and metal components remaining after removal were analyzed.

Example 1

As an amine type extractant, TNOA produced by Kao Corp., which was diluted with EM Clean 3000 produced by Japan Energy Corp. so that its concentration became 30% by volume, was used. Said extractant was mixed with a reagent solution to extract cobalt into the organic phase, followed by stripping of cobalt complex ion from said organic phase, to prepare an amine type extractant after stripping. In Table 1, compositions of metal components in the amine type extractant after stripping are shown.

TABLE 1

| Amine type extractant | Concentration (g/l) | | | |
|---|---|---|---|---|
| | Co | Cu | Fe | Zn |
| Extractant after stripping | <0.01 | 0.34 | 1.75 | 2.32 |

Firstly, scrubbing with a sulfurous acid solution (the procedure of the above-described (1)) was carried out by using the above-described amine type extractant after stripping.

The above-described amine type extractant after stripping (30 mL) was fractionated into a glass beaker, then a saturated sulfurous acid solution (30 mL) was mixed thereto in the glass beaker so that a volume ratio of the organic phase to the aqueous phase became 1:1, and the mixture was stirred for 10 minutes. After stirring, the mixture was left at rest for 10 minutes to separate the organic phase and the aqueous phase, then only the aqueous phase was taken away. A series of these procedures was repeated 3 times in total. It should be noted that, occurrence of precipitates was not observed in each scrubbing step. After that, concentrations of impurity elements remaining in the amine type extractant and removal ratios of impurity elements from the amine type extractant in each scrubbing step were measured. Results are shown in Table 2.

TABLE 2

| Amine type extractant | Concentration (g/l) | | | | ORP (mV) |
|---|---|---|---|---|---|
| | Co | Cu | Fe | Zn | |
| Extractant after 3 times of washing with sulfurous acid solution | <0.01 | 0.25 | <0.01 | 0.11 | — |
| Buildup removal ratio of impurity | Washing with sulfurous acid solution (1st time) | — | 16% | 75% | 10% | 335 |
| | Washing with sulfurous acid solution (2nd time) | — | 27% | 93% | 64% | 220 |
| | Washing with sulfurous acid solution (3rd time) | — | 27% | 100% | 95% | 185 |

From Table 2, it can be understood that 95% or more of iron and zinc can be removed by 3 times of scrubbing of the above-described amine type extractant after stripping with a saturated sulfurous acid solution. It should be noted that, in this case, an oxidation-reduction potential (ORP) of the aqueous solution after scrubbing was adjusted at 185 mV based on silver/silver chloride electrode.

Subsequently, the procedures of the above-described (2) and (3) were carried out by using the amine type extractant obtained in the procedure of the above-described (1), to obtain the amine type extractant, in which extracting capability was regenerated so that the amine type extractant can be repeatedly reused as it is in the extraction stage in the solvent extraction process and iron and zinc were removed.

Comparative Example 1

Using the same amine type extractant after stripping as in Example 1, the amine type extractant after stripping and 5 M of sodium hydroxide aqueous solution were poured into a glass beaker so that a volume ratio thereof became 1:1, and the mixture was stirred with a stirrer for 10 minutes. After stirring, the mixture was left at rest for 10 minutes to separate to organic phase and aqueous phase. After that, concentrations of impurity elements remaining in the amine type extractant and removal ratios of impurity elements from the amine type extractant were measured. Results are shown in Table 3.

TABLE 3

| Amine type extractant | Concentration (g/l) | | | | Remark |
|---|---|---|---|---|---|
| | Co | Cu | Fe | Zn | |
| Extractant after alkali washing | <0.01 | <0.01 | <0.01 | <0.01 | Precipitates were observed. |

From Table 3, it can be understood that although impurity elements in the extractant can be sufficiently removed, this method is not practical because filtration requires labor and time due to occurrence of precipitates.

Examples 2 to 6, Comparative Example 2

As an amine type extractant, TNOA produced by Kao Corp., which was diluted with EM Clean 3000 produced by Japan Energy Corp. so that its concentration became 30% by volume, was used. This extractant was mixed with a reagent solution to extract cobalt into the organic phase, followed by stripping of cobalt complex ion from said organic phase, to prepare an amine type extractant after stripping. In Table 4, compositions of metal components in the amine type extractant after stripping are shown.

TABLE 4

| Amine type extracting agent | Concentration (g/l) | | | | (mol/l) (Cu + Fe + Zn) Total |
|---|---|---|---|---|---|
| | Co | Cu | Fe | Zn | |
| Extracting agent after stripping | 0.04 | 0.58 | 2.00 | 2.23 | 0.08 |

Firstly, scrubbing (the procedure of the above-described (1)) with a saturated sulfurous acid solution was carried out by using the above-described amine type extractant after stripping, varying the volume ratio of the organic phase and the aqueous phase in the scrubbing and the number of the scrubbing.

The above-described amine type extractant after stripping (20 mL) was fractionated into a glass beaker, then a saturated sulfurous acid solution was mixed thereto in the glass beaker so that a volume ratio of the organic phase to the aqueous phase became prescribed ratios, and the mixture was stirred with a stirrer for 10 minutes. After stirring, the mixture was left at rest for 10 minutes to separate the organic phase and the aqueous phase, then only the aqueous phase was taken away. Here, as for conditions of volume ratio of the organic phase and the aqueous phase and the number of the scrubbing, volume ratio of the organic phase and the aqueous phase in the total scrubbing is 1:3, at 1:1 and 3 times (Example 2); volume ratio of the organic phase and the aqueous phase in the total scrubbing is 1:3, at 1:3 and one time (Example 3); volume ratio of the organic phase and the aqueous phase in the total scrubbing is 1:2, at 1:1 and 2 times (Example 4); volume ratio of the organic phase and the aqueous phase in the total scrubbing is 1:2 at 1:2 and one time (Example 5); and volume ratio of the organic phase and the aqueous phase in the total scrubbing is 1:1 at 1:1 and one 1 time (Example 6). It should be noted that, occurrence of precipitates was not observed in each scrubbing. After that, concentrations of impurity elements remaining in the amine type extractant, removal ratios of impurity elements from the amine type extractant, and molar ratios of chloride ion/metal ion removed from the organic phase in each scrubbing step were determined. Results are shown in Tables 5 and 6.

TABLE 5

| | Concentration (g/l) | | | | Removal ratio of (Cu + Fe + Zn) (%) | ORP (mV) |
|---|---|---|---|---|---|---|
| | Co | Cu | Fe | Zn | | |
| Example 2 | <0.01 | 0.45 | <0.01 | 0.04 | 90 | 192 |
| Example 3 | <0.01 | 0.25 | <0.01 | 0.17 | 91 | 245 |
| Example 4 | <0.01 | 0.45 | 0.13 | 0.78 | 72 | 230 |
| Example 5 | <0.01 | 0.32 | 0.26 | 0.75 | 73 | 280 |
| Example 6 | <0.01 | 0.46 | 0.46 | 2.03 | 29 | 343 |

TABLE 6

| | Ratio of chloride ion/metal ion removed from the organic phase |
|---|---|
| Example 2 | 3.6 |
| Example 3 | 3.0 |
| Example 4 | 3.6 |
| Example 5 | 3.3 |
| Example 6 | 4.1 |

From Table 5, it can be understood that if volume ratio of the organic phase and the aqueous phase in the total scrubbing is similar, removal ratio of impurity elements from the amine type extractant becomes approximately same level. Namely, it can be understood that if concentration of sulfite ion in the scrubbing liquid is same, same level of removal ratio of impurity elements can be obtained either in the case of multistage washing in which extractant is repeatedly washed using same amount of scrubbing liquid to the extractant, or in the case when the extractant is washed at a time using an increased ratio of washing liquid to the organic phase.

From Table 6, it can be understood that molar ratio of chloride ion and metal ion removed from the organic phase is about 3 to 4 in any case, suggesting that iron and zinc present as chloro complex ions have been eliminated.

Subsequently, the procedure of the above-described (2) was carried out by using the amine type extractant obtained in the procedure of the above-described (1) in Example 3.

Here, the amine type extractant (30 mL) (containing a sulfur in a content of 1.16 mol/L) after reduction with sulfurous acid solution was fractionated into a glass beaker, then a hydrogen peroxide aqueous solution (Examples 3-1 to 3-4, Comparative Example 2) containing the varying amount of hydrogen peroxide was mixed in the glass beaker so that volume ratio of the organic phase and the aqueous phase became 1:1, and the mixture was stirred with a stirrer for 10 minutes. After stirring, the mixture was left at rest for 10 minutes to separate the organic phase and the aqueous phase. After that, concentration of sulfur removed from the extractant, oxidation-reduction potential (ORP) of the aqueous solution after the scrubbing, and color change of the extractant after the scrubbing were determined. It should be noted that, color change of the extractant after the scrubbing to orange represents oxidation and deterioration of the extractant. Results are shown in Table 7.

TABLE 7

| | Adition amount of hydrogen peroxide solution (mol/l) | Conc. of sulfur removed from the extractant (mol/l) | ORP value (mV) | Color change of the extractant |
|---|---|---|---|---|
| Example 3-1 | 0.08 | 0.10 | 295 | No change (Yellow) |
| Example 3-2 | 0.20 | 0.22 | 278 | No change (Yellow) |
| Example 3-3 | 0.40 | 0.41 | 306 | No change (Yellow) |
| Example 3-4 | 0.83 | 0.73 | 413 | No change (Yellow) |
| Comparative Example 2 | 1.55 | 0.70 | 650 | Changed (Orange) |

From Table 7, it can be understood that concentration of removed sulfur increases along with increase in amount of hydrogen peroxide, that is, sulfite ion remaining in the extractant is oxidized to sulfate ion to be removed from the extractant. However, in Comparative Example 2, it is found that oxidation-reduction potential (based on silver/silver chloride electrode) exceeds 550 mV, and color of the extractant after scrubbing changes to orange.

Finally, the procedure of (3) was carried out by using the amine type extractant obtained by the procedures of the above-described (1) and (2) in Examples 3-1 to 3-4, to obtain the amine type extractant in which iron and zinc had been removed, and extracting capability thereof had been regenerated so that the extractant could be repeatedly reused as it is in the extraction stage in the solvent extraction process.

Example 7

The procedure of (3) was carried out by using the amine type extractant obtained by scrubbing with a saturated sulfurous acid solution in Example 4.

To the above amine type extractant (containing a sulfur in a concentration of 0.81 mol/L) (30 mL), an aqueous solution containing a chloride ion which contained 0.54 mol/L of hydrogen peroxide by adding a hydrogen peroxide aqueous solution (concentration: 34.5% by mass) was mixed so that volume ratio of the organic phase and the aqueous phase became 1:1. It should be noted that, addition amount of the oxidizing agent was set to be 67% to the sulfur concentration in the above-described amine type extractant. Here, as the aqueous solution containing a chloride ion in the procedure of (3), a saturated sodium chloride aqueous solution was used.

As a result, sulfur concentrations removed from the extractant were 0.46 mol/L in the procedure of (2), 0.23 mol/L in the procedure of (3), and 0.69 mol/L in total. From these results, it can be understood that sulfate ion is eliminated insufficiently only by the procedure of (2), but eliminated sufficiently by adding the procedure of (3).

Examples 8 to 11

The procedure (4) was carried out by using the amine type extractant obtained by scrubbing with a saturated sulfurous acid solution in Example 4.

To the above-described amine type extractant (containing sulfur in a concentration of 0.81 mol/L) (30 mL), an aqueous solution containing a chloride ion which contained 0.54 mol/L of hydrogen peroxide by adding a hydrogen peroxide aqueous solution (concentration: 34.5% by mass) was mixed so that volume ratio of the organic phase and the aqueous phase became 1:1. The mixture was stirred with a stirrer for 10 minutes. After stirring, the mixture was left at rest for 10 minutes to separate the organic phase and the aqueous phase. Here, addition amount of the oxidizing agent was set to be 67% to the sulfur concentration in the above-described amine type extractant. Here, as the aqueous solution containing a chloride ion, 2 M hydrochloric acid (Example 8), 5 M hydrochloric acid (Example 9), 2 M sodium chloride aqueous solution (Example 10), and 6.1 M sodium chloride aqueous solution (Example 11) were used. After that, concentrations of sulfur removed from the extractant were determined. Results are shown in Table 8.

TABLE 8

| | Liquid used in the oxidation | Sulfur concentration removed from the extractant (mol/l) |
|---|---|---|
| Example 8 | 2M Hydrochloric acid | 0.64 |
| Example 9 | 5M Hydrochloric acid | 0.67 |

TABLE 8-continued

| | Liquid used in the oxidation | Sulfur concentration removed from the extractant (mol/l) |
|---|---|---|
| Example 10 | 2M Sodium chloride | 0.65 |
| Example 11 | 6.1M Sodium chloride | 0.69 |

From Table 8, it can be understood that by scrubbing with a chloride aqueous solution containing an oxidizing agent, sulfate ion can be removed in the similar degree to that in Example 7.

As obvious from the above results, since the amine type extractant containing the iron and zinc was carried out according to the method of the present invention by sequentially scrubbing with an aqueous solution containing a sulfite ion (the procedure of (1)), scrubbing with an aqueous solution containing an oxidizing agent (the procedure of (2)), and scrubbing with an aqueous solution containing a chloride ion (the procedure of (3)) under specified conditions in Examples 1 to 7, or by conducting a procedure in which scrubbing is carried out with an aqueous solution containing a chloride ion while an oxidizing agent is added in Examples 8 to 11, it can be understood that iron, zinc and copper in the extractant can be efficiently removed without forming any crud, and also with less amount of scrubbing liquid, and that extracting capability of the extractant can be regenerated so that the extractant can be repeatedly reused as it is in the extraction stage. On the contrary, in Comparative Examples 1 and 2, it can be also understood that satisfactory results cannot be obtained due to occurrence of crud or oxidation of the extractant because scrubbing does not adapt to these conditions.

As mentioned above, the method for scrubbing an amine type extractant after stripping of the present invention is a suitable method for regenerating by scrubbing the amine type extractant containing a ferric (III) chloro complex ion and zinc chloro complex ion obtained by back extracting a cobalt with a hydrochloric acid aqueous solution from the amine type extractant after extracting cobalt, in the solvent extraction in which cobalt is extracted from a hydrochloric acid aqueous solution containing a nickel and cobalt and separated from nickel.

What is claimed is:

1. A method for scrubbing an amine extractant after stripping, said method being a scrubbing method of an amine extractant (A) containing a ferric chloro complex ion and a zinc chloro complex ion obtained by back extracting cobalt with hydrochloric acid aqueous solution from an amine extractant after extracting cobalt, in a solvent extraction to extract cobalt from the hydrochloric acid aqueous solution containing nickel and cobalt and separating cobalt from nickel, comprising the procedures of the following steps (1) to (3):

(1) an amine extractant (B) containing sulfite ion is obtained by adding an aqueous solution containing a sulfite ion to the amine extractant (A) and stirring the mixture so that oxidation-reduction potential (based on silver/silver chloride electrode) of the aqueous solution after scrubbing becomes 80 to 550 mV, reducing the ferric chloro complex ion in said amine extractant (A) to divalent, then after leaving at rest, separating the aqueous solution containing the ferrous chloro complex ion and zinc sulfite formed;

(2) an amine extractant (C) containing a sulfate ion is obtained by adding an aqueous solution containing an oxidizing agent or an oxidizing agent and water to the amine extractant (B) and stirring the mixture so that oxidation-reduction potential (based on silver/silver chloride electrode) of the aqueous solution after scrubbing becomes 80 to 550 mV, oxidizing a sulfite ion in said amine extractant (B) to sulfate ion, then after leaving at rest, separating the sulfate aqueous solution formed; and (3) an amine extractant (D) is obtained by adding an aqueous solution containing a chloride ion to the amine extractant (C) and stirring the mixture, replacing a sulfate ion in said amine extractant (C) with chloride ion, then after leaving at rest, separating an aqueous solution containing a sulfate ion formed.

2. The method for scrubbing amine extractant after stripping according to claim 1, comprising the procedure of the following step (4) instead of the procedures of steps (2) and (3):

(4) an amine extractant (D) is obtained by adding an oxidizing agent and an aqueous solution containing chloride ion to the amine extractant (B) and stirring the mixture so that oxidation-reduction potential (based on silver/silver chloride electrode) of the aqueous solution after scrubbing becomes 80 to 550 mV, oxidizing a sulfite ion in said amine extractant (B) to a sulfate ion, and replacing said sulfate ion with chloride ion, then after leaving at rest, separating an aqueous solution containing the sulfate ion formed.

3. The method for scrubbing amine extractant after stripping according to claim 1, wherein in the procedure of step (1), the aqueous solution containing sulfite ion is sulfurous acid solution.

4. The method for scrubbing amine extractant after stripping according to claim 1, wherein in the procedure of step (2), the oxidizing agent is hydrogen peroxide.

5. The method for scrubbing amine extractant after stripping according to claim 2, wherein in the procedure of step (4), the oxidizing agent is hydrogen peroxide and the aqueous solution containing chloride ion is an aqueous solution containing hydrochloric acid or sodium chloride.

6. The method for scrubbing amine extractant after stripping according to claim 1, wherein the amine extractant contains at least one tertiary amine and a diluent consisting of an aromatic hydrocarbon, and said tertiary amine is contained in 10 to 40% by volume relative to the total volume.

7. The method for scrubbing amine extractant after stripping according to claim 2, wherein in the procedure of step (1), the aqueous solution containing a sulfite ion is a sulfurous acid solution.

8. The method for scrubbing amine extractant after stripping according to claim 2, wherein the amine extractant contains at least one tertiary amine and a diluent consisting of an aromatic hydrocarbon, and said tertiary amine is contained in 10 to 40% by volume relative to the total volume.

9. The method for scrubbing amine extractant after stripping according to claim 3, wherein the amine extractant contains at least one tertiary amine and a diluent consisting of an aromatic hydrocarbon, and said tertiary amine is contained in 10 to 40% by volume relative to the total volume.

10. The method for scrubbing amine extractant after stripping according to claim 4, wherein the amine extractant contains at least one tertiary amine and a diluent consisting of an aromatic hydrocarbon, and said tertiary amine is contained in 10 to 40% by volume relative to the total volume.

11. The method for scrubbing amine extractant after stripping according to claim 5, wherein the amine extractant contains at least one tertiary amine and a diluent consisting of an aromatic hydrocarbon, and said tertiary amine is contained in 10 to 40% by volume relative to the total volume.

12. The method for scrubbing amine extractant after stripping according to claim 7, wherein the amine extractant contains at least one tertiary amine and a diluent consisting of an aromatic hydrocarbon, and said tertiary amine is contained in 10 to 40% by volume relative to the total volume.

* * * * *